Figure 2:
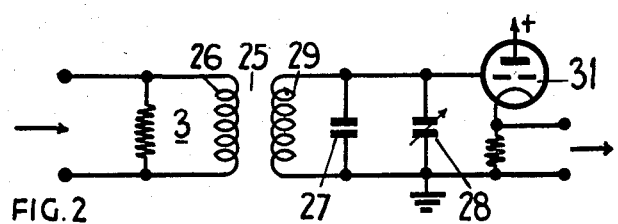

Jan. 5, 1960  J. E. BRYDEN  2,920,271
APPARATUS FOR THE MEASUREMENT OF PHASE
DISTORTION IN ELECTRIC CIRCUITS
Filed May 12, 1954  3 Sheets-Sheet 1

INVENTOR
Joseph Easto Bryden
BY
ATTORNEY

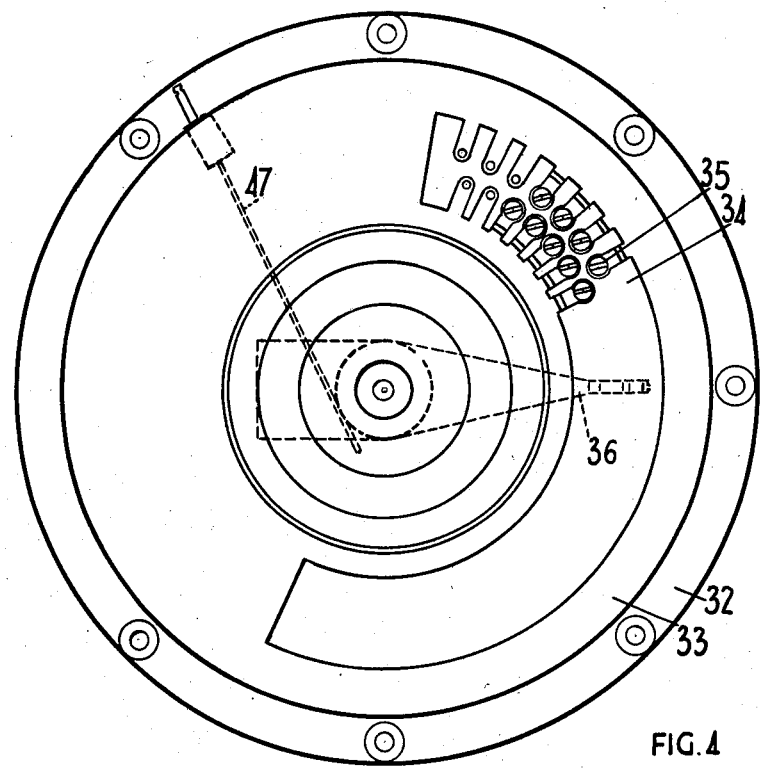
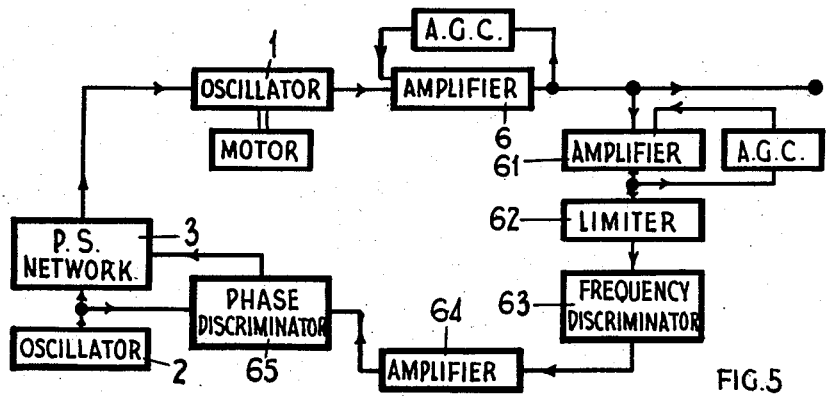

United States Patent Office 2,920,271
Patented Jan. 5, 1960

2,920,271

APPARATUS FOR THE MEASUREMENT OF PHASE DISTORTION IN ELECTRIC CIRCUITS

Joseph Easto Bryden, Harrow, England, assignor to The General Electric Company Limited, London, England Application May 12, 1954, Serial No. 429,340

Claims priority, application Great Britain May 15, 1953

8 Claims. (Cl. 324—57)

The present invention relates to apparatus for the measurement of phase distortion in electric circuits. Such a circuit may, for example, be apparatus for use in a signalling system or it may be a complete signalling system.

The quantity measured is usually what is known as the group delay which is the rate of change of phase shift with frequency, the group delay being measured at frequencies in the band of frequencies that the circuit is required to pass.

In known forms of apparatus for measuring group delay, it is usually found that the measuring apparatus itself introduces some phase distortion although this is not serious if it is small compared with that of a circuit under test. If, however, the circuit under test is to be adjusted to give a relatively small group delay, the inherent group delay of the measuring apparatus can become serious.

It is one object of the present invention to provide apparatus for the measurement of phase distortion in which this difficulty is overcome.

According to the present invention, apparatus for the measurement of phase distortion in an electric circuit over a band of frequencies comprises means for generating an electric test signal consisting of an oscillation that is frequency modulated by an oscillation of relatively low frequency $F_1$ and has its mean frequency periodically scanned through the band of frequencies at a frequency $F_2$ that is lower than the frequency $F_1$, means to demodulate the test signal passed by a circuit under test so as to derive an oscillation of frequency $F_1$, an indicating device to which is arranged to be supplied the oscillation of frequency $F_1$ derived by the last-mentioned means and which is adapted to show variations of the group delay as the mean frequency of the test signal is scanned over the said band, and means to apply a correction so that the indication given by said device is substantially independent of the group delay that is inherent to the apparatus.

Preferably the correction is effected by means of a variable phase-shifting means. Such a means may be connected in the path of an oscillation of frequency $F_1$ that is used to frequency modulate the oscillation forming the test signal. The phase-shifting means may be arranged to be driven synchronously with means for varying the mean frequency of the test signal or there may be means to demodulate a portion of the test signal so as to derive an oscillation of frequency $F_1$ and means to control the phase-shifting means in dependence upon the phase of this derived oscillation, this demodulating means having substantially the same phase distortion characteristic as the corresponding means to which is supplied the signal passed by a circuit under test. Alternatively the phase-shifting means may be provided in the path of either the oscillation of frequency $F_1$ derived by demodulating the test signal passed by a circuit under test or a reference oscillation with which the derived oscillation is compared, the phase-shifting means in this case being arranged to be driven synchronously.

Figure 1:
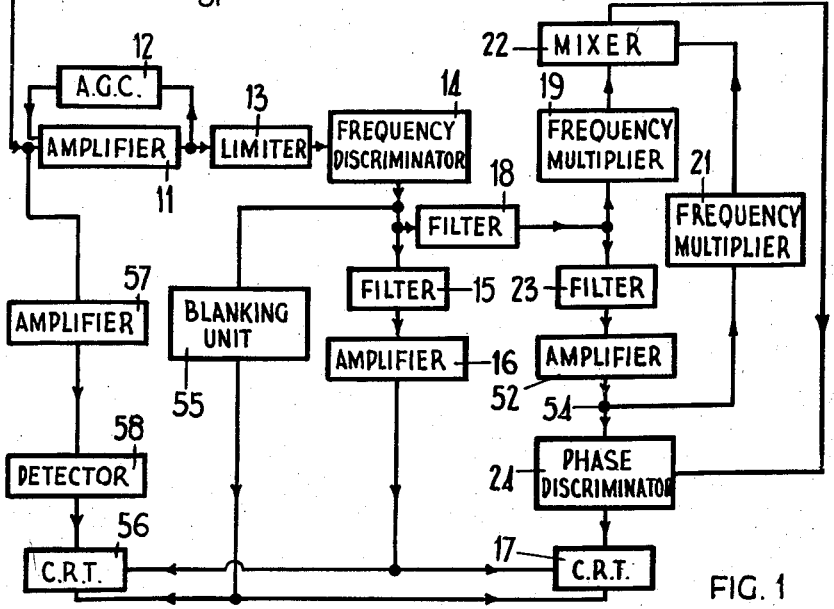
Figure 3:
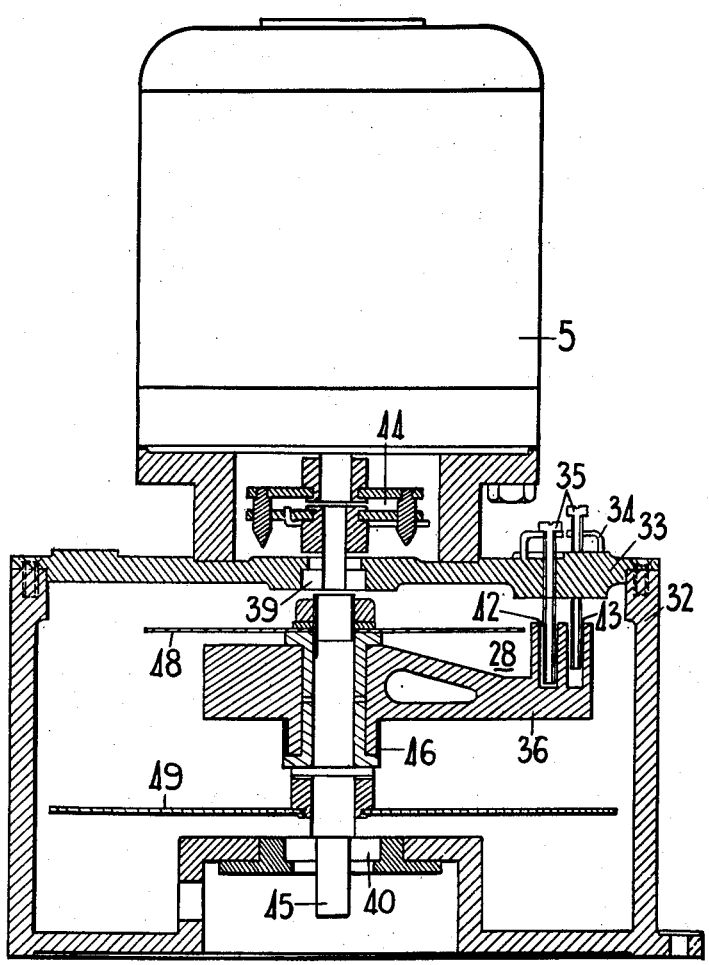

Two examples of apparatus in accordance with the present invention will now be described with reference to the five figures of the accompanying drawings in which:

Figure 1 shows diagrammatically the circuit of the first example,

Figure 2 shows the circuit diagram of a phase-shifting network that forms part of the first example, Figure 3 shows in elevation the construction of a variable condenser that forms part of the said phase-shifting network and its associated electric motor, part of this view being in cross-section, Figure 4 shows a plan view of the said condenser without its associated electric motor, and Figure 5 shows diagrammatically the circuit of part of the second example.

The apparatus to be described is suitable for making tests on any network or system that is adapted to transmit signals in a frequency band between 50 and 70 megacycles per second. In the case of a complete signalling system, this signal may be transmitted over a radio link by being modulated on to a high frequency carrier.

The apparatus to be described consists of two major parts, one part being arranged to supply the test signal to a network or system while the other part is responsive to the test signal passed by the network or system. It will be realised that when a complete signalling system is being tested these two parts of the measuring apparatus will be located at the terminal station of the system which may be many miles apart. As will be apparent herein after, however, no transmission path other than the system itself is required between the parts of the apparatus situated at the terminals of the system for the purpose of transmitting a reference signal.

In the first example, referring now to Figure 1, the test signal is generated by an oscillator 1 which is constructed as described in the Provisional Specification of British patent application No. 1,459/54. The oscillator 1 is frequency modulated over a relatively small range, for example 100 kilocycles per second on either side of its mean frequency by the signal supplied by a crystal-controlled oscillator 2 through a phase-shifting network 3 and a band-pass filter 4. The manner in which the phase-shifting network 3 operates will be described hereinafter, but at the present moment may be disregarded. In addition the mean operating frequency of the oscillator 1 is scanned over the range 50 to 70 megacycles per second fifty times a second by mechanical tuning that is driven by a synchronous electric motor 5. During each scan between 50 and 70 megacycles per second the rate of change of the mean frequency of the signal supplied by the oscillator 1 is substantially constant.

The signal supplied by the oscillator 1 is passed through an amplifier 6 which is provided with a fast-acting automatic gain control loop 7 so that the test signal developed at the terminal 8 is of substantially constant amplitude.

In an alternative arrangement the test signal may be supplied by a mixer to which are supplied the outputs from two oscillators. One of these oscillators is mechanically tuned by a synchronous electric motor so that its operating frequency is scanned over the range 100 to 120 megacycles per second fifty times a second. The other oscillator is arranged to be frequency modulated, and for this purpose a modulation signal consisting of an oscillation having a frequency of 120 kilocycles per second is supplied to the oscillator through a phase-shifting network which serves the same purpose as the previously mentioned phase-shifting network.

In Figure 1, the network or system under test is represented by a broken line 9. The test signal supplied by the network or system under test is passed through an amplifier 11 that has a fast-acting automatic gain control loop 12 and a limiter 13 to a frequency discriminator 14. The 50 cycle per second modulation of the test signal is derived from the output of this discriminator 14 by means of a filter 15 and this modulation is passed through an amplifier 16 to provide the signal for effecting horizontal deflection of the trace on the screen (not shown) of a cathode ray tube 17. The horizontal deflection of the trace at any instant is thus a measure of the mean frequency of the test signal as it is being scanned through the band 50 to 70 megacycles per second.

The phase of the 120 kilocycles per second oscillation passed by the discriminator 14 at any instant will, of course, depend on the group delay of the system under test together with the measuring apparatus at the mean frequency of the test signal at that instant. This group delay may vary as the mean frequency of the test signal is scanned over the band and the variation of phase of this oscillation is arranged to be amplified. This oscillation is selected by a band-pass filter 18 that has a mid-band pass frequency of 120 kilocycles per second and is supplied to a frequency multiplier 19 which has a multiplication factor N, which may for example be 10. The output from the frequency multiplier 19 together with a reference oscillation of frequency 120 kilocycles per second which has been passed through a frequency multiplier 21 having a multiplication factor $N-1$ is fed to a mixer 22 so as to derive a 120 kilocycles per second oscillation having increased phase shift.

The said reference oscillation is obtained by passing the 120 kilocycles per second oscillation passed by the filter 18 through a crystal band-pass filter 23 which has a narrow pass band. It will be appreciated that the oscillation passed by the filter 23 will be of substantially constant phase as the frequency of the test signal is varied over its band. This reference oscillation and the said oscillation supplied by the mixer 22 are fed to a phase discriminator 24 and the output therefrom is utilised to control the vertical deflection of the trace on the screen of the cathode ray tube 17. A blanking unit 55 is arranged to derive a signal from the output of the frequency discriminator 14 which is supplied to the cathode ray tube 17 in known manner for the purpose of suppressing the electron beam in the cathode ray tube during each flyback period.

The vertical deflection of the trace on the screen of the cathode ray tube 17 is thus a measure of the group delay at any instant and since the horizontal deflection of the trace is a measure of the mean frequency of the test signal the variation of group delay over the said band is represented on the screen. As already discussed, the group delay at any frequency is partly due to the inherent group delay of the testing apparatus and this is compensated for in the apparatus being described by adjusting the phase-shifting network 3.

Referring now to Figure 2, the phase-shifting network 3 comprises the transformer 25 to the primary winding 26 of which is supplied the output from the oscillator 2. A fixed condenser 27 and a variable condenser 28 are connected across the secondary winding 29 of the transformer 25. The voltage developed across the resulting parallel-resonant circuit which is tuned to a frequency of approximately 120 kilocycles per second is supplied to a triode thermionic valve 31 which is arranged to operate as a cathode follower stage.

The construction of the variable condenser 28 is shown in Figures 3 and 4, and, referring now to these figures, the condenser 28 is contained within a metal housing 32 which is earthed. The top 33 of the housing 32 carries an arcuate member 34 through which are screwed fifty screws 35 (only some of which are shown in Figure 4). The capacity of the condenser 28 is provided between the portions of the screws 35 that project within the housing 32 and an aluminium member 36. The member 36 is mounted on a shaft 37 for rotation between ball races 39 and 40 and the end of the member 36 remote from the shaft 37 is provided with two grooves 42 and 43 into which the screws 35 project as the member 36 is rotated. The shaft 37 is coupled to the motor 5 through a coupling 44. As already mentioned, the tuning of the oscillator 1 is arranged to be driven by the motor 5 and for this purpose the end 45 of the shaft 37 is connected to the tuning member of the oscillator 1, although this is not shown in Figure 3. Connection to the member 36 is made through a brass slip ring 46 against which bears a spring member 47. A pair of electrostatic guard plates 48 and 49 are provided on either side of the member 36.

During operation, the member 36 rotates fifty times a second and at any instant the position of the member 36 relative to the screws 35 corresponds to the particular mean frequency of the test signal at that instant. The capacity of the condenser 28 and thus the phase shift introduced by the network 3 when the member 36 is in any particular position is dependent upon the distance that the screws 35 in the vicinity of the end of the member 36 project into the housing 32.

The screws 35 are preset before the apparatus is used for measuring the group delay of a network or system so as to compensate for the inherent group delay of the apparatus. For this purpose the two parts of the apparatus are brought together and a physical connection is made between the terminals 8 and 51. The apparatus is then operated with the result that variations in the inherent group delay of the apparatus over the said band are presented on the screen of the cathode ray tube 17. It is required that there shall be a constant indication of group delay throughout the band and accordingly the screws 35 are adjusted so that a horizontal trace is produced on the said screen. The apparatus is then ready for use and when a network or system to be tested is connected between the terminals 8 and 51, the image produced on the screen of the cathode ray tube 17 will then show the variations in group delay due to the network or system alone.

If the two parts of the apparatus are being used in close proximity it is unnecessary to derive the reference oscillation from the signal supplied by a network being tested. In that case the filter 23 and amplifier 52 may be omitted and a connection made between the points 53 and 54.

Since the test signal supplied to the network or system under test is of substantially constant amplitude while it is being scanned over the frequency band, the amplitude of the signal supplied by the network or system may be used to measure the amplitude/frequency characteristic thereof. As shown in Figure 1, this characteristic may be presented on the screen of another cathode ray tube 56, the same horizontal deflecting and blanking signals being supplied to this tube 56 as to the cathode ray tube 17, while a portion of the signal supplied from the terminal 51 is passed through an amplifier 57 to a detector 58, the output from the detector 58 being utilised to control the vertical deflection of the trace on the screen of this tube 56.

Instead of providing the phase-lifting network 3 in the part of the apparatus that supplies the test signal to the network or system under test as described above, this phase-shifting network may be provided in the other part of the apparatus. For example it may be connected in either the path of the 120 kilocycles per second reference oscillation between the filter 23 and the amplifier 52 or in the path of the 120 kilocycles per second oscillation supplied to the frequency multiplier 19. In either case it is necessary to synchronise the motor driving the phase-shifting network with the change in mean frequency of the test signal and this may be done by locking this motor to the 50 cycles per second modulation that is selected by the filter 15.

Alternatively, phase-shifting networks similar to the network 3 described above may be provided in both parts of the apparatus in the manner described. If then the phase-shifting network of each part is adjusted to give that part a predetermined group delay over the required band of frequencies, the separate parts of sets of apparatus that have been similarly adjusted are interchangeable. Preferably each part is arranged to have a constant group delay throughout the band.

If the apparatus has a relatively large group delay over some portion of the band of frequencies of the test signal, this may be compensated for in part by a phase equaliser.

The second example in accordance with the present invention makes use of a test signal that is the same as that described above in connection with the first example, and Figure 5 of the accompanying drawings only shows that part of the apparatus for supplying this test signal to a network or system under test since the part that is responsive to the signal passed by the network or system is identical with the corresponding part described above with reference to Figure 1.

In Figure 5 the same reference numerals have been used as in Figure 1 for corresponding portions of the apparatus, but in this case the phase-shifting network 3 is not driven by a synchronous electric motor. A portion of the test signal passed by the amplifier 6 is, however, fed through an amplifier 61 and a limiter 62 to a frequency discriminator 63, the amplifier 61, limiter 62 and frequency discriminator 63 being identical with the amplifier 11, limiter 13 and frequency discriminator 14 respectively of the part of the apparatus to which the test signal passed by the network or system under test is supplied.

In the absence of the phase-shifting network 3, the group delay of the 120 kilocycles per second oscillation passed by the discriminator 63 would thus be equal to the group delay of the oscillation passed by the discriminator 14 due to the inherent group delay of the apparatus. The oscillation passed by this discriminator 63 is passed through an amplifier 64 and the phase thereof then compared with that of a reference oscillation supplied by the crystal oscillator 2 by means of a phase discriminator 65. The output from this discriminator is utilised to control the phase-shifting network 3 so as to compensate for the inherent group delay of the apparatus at all frequencies over which the test frequency is scanned. In this case the phase-shifting network does not have the construtcion previously described, but may be of any well known form.

I claim:

1. Apparatus for the measurement of phase distortion in an electric circuit over a band of frequencies comprising a variable frequency oscillator which is modulated by a modulation signal supplied thereto and which generates a test signal for supplying to a circuit to be tested, a further oscillator that operates at a frequency $F_1$ and supplies the said modulation signal, means periodically to tune the said variable frequency oscillator at a frequency $F_2$ through the said band of frequencies, means to demodulate the test signal passed by a circuit under test so as to derive an oscillation of frequency $F_1$, means to supply a reference oscillation of frequency $F_1$, a phase discriminator which compares the relative phase of the two oscillations of frequency $F_1$ that are supplied by the two last mentioned means and which supplies an electric signal the amplitude of which is a measure of that phase, a cathode ray tube, means to supply an electric scanning signal to cause the electron beam in the cathode ray tube periodically and at the frequency $F_2$ to scan the screen of the tube and thereby produce a trace thereon, means to apply the said electric signal supplied by the phase discriminator to deflect said trace, variable phase shifting means to vary the phase of one of said oscillations of frequency $F_1$, and means to control said phase-shifting means in synchronism with the variation in the frequency of the variable frequency oscillator as that oscillator is tuned through the said band of frequencies as aforesaid so that the deflection of the trace on the screen of the cathode ray tube is substantially uniform if the said test signal is supplied directly to the said means for demodulating the test signal without passing through a circuit under test.

2. Apparatus according to claim 1 wherein the said variable phase-shifting means is connected a path over which is passed the modulation signal supplied by the further oscillation.

3. Apparatus according to claim 2 wherein there is means synchronously to drive the said phase-shifting means and means for varying the mean frequency of the test signal.

4. Apparatus according to claim 2 wherein there is means to demodulate a portion of the test signal so as to derive an oscillation of frequency $F_1$ and means to control the said phase-shifting means in dependence upon the phase of this derived oscillation, this demodulating means having substantially the same phase distortion characteristic as the corresponding means to which is supplied the signal passed by a circuit under test.

5. Apparatus according to claim 1 wherein said phase-shifting means is provided in the path of the oscillation of frequency $F_1$ derived by demodulating the test signal passed by a circuit under test or the reference oscillation with which the derived oscillation is compared.

6. Apparatus according to claim 1 wherein the said variable phase shifting means is provided with a plurality of adjustments which correspond to different frequencies of the test signal and which enable the phase shift characteristic of the phase shifting means to be adjusted to give, as aforesaid, the desired uniform trace on the screen of the cathode ray tube as the frequency of the variable frequency oscillator is tuned through the said band of frequencies.

7. Apparatus according to claim 1 wherein the said variable phase-shifting means comprises a phase-shifting network having a two-terminal variable condenser which is formed by a first member which constitutes one of the terminals of the condenser, a second member which constitutes the other terminal of the condenser, a plurality of parts mounted on the first member, means to mount the second member for rotation so that as the second member rotates it passes close to each of the said parts in turn, and means to enable the position of each of said parts to be adjusted so that the capacity between each part and the second member as it passes close to that part may be changed; and means to rotate the second member in synchronism with the tuning of the variable frequency oscillator so that, at any instant, the position of the second member and thus the phase-shift to which the oscillations of frequency $F_1$ are subjected by the phase-shifting network corresponds to the frequency of the variable frequency oscillator at that instant.

8. Apparatus for the measurement of phase distortion in an electric circuit over a band of frequencies comprising test signal generating means for supplying to a circuit to be tested an electric test signal that consists of an oscillation that is frequency modulated by an oscillation of relatively low frequency $F_1$ and has its mean frequency periodically scanned through the band of frequencies at a frequency $F_2$ that is lower than the frequency $F_1$ and group delay indicating means responsive to the test signal passed by a circuit under test; the test signal generating means comprising a signal-carrying path, a variable frequency oscillator which is frequency modulated by the signal supplied thereto over said path and which supplies the said electric test signal, a further oscillator that operates at the frequency $F_1$, means to cause the mean frequency of the variable frequency oscillator to be varied through the said band of frequencies at the frequency $F_2$, variable phase-shifting means connected between the further oscillator and the said path, and means to control the said phase-shifting means in synchronism with the mean frequency of the variable frequency oscillator being varied through the said band of frequencies; the group delay indicating means comprising means to demodulate the test signal passed by a circuit under test so as to derive an oscillation of frequency $F_1$, means to supply a reference oscillation of frequency $F_1$, a phase discriminator which compares the relative phase of the oscillations of frequency $F_1$ that are supplied by the two last mentioned means and which supplies an electric signal the amplitude of which is a measure of that phase, a cathode ray tube, means to supply an electric scanning signal to cause the electron beam in the cathode ray tube periodically and at the frequency $F_2$ to scan the screen of the tube and thereby produce a trace, and means to apply the said electric signal supplied by the phase discriminator to deflect the said trace; the said phase-shifting means being controlled as aforesaid so that the deflection of the trace on the screen of the cathode ray tube is substantially uniform as the mean frequency of the test signal is scanned over the said band if the said test signal is supplied directly to the said means for demodulating the test signal without passing through a circuit under test.

References Cited in the file of this patent

UNITED STATES PATENTS

| | | |
|---|---|---|
| 2,232,792 | Levin | Feb. 25, 1941 |
| 2,330,965 | Fredendall | Oct. 5, 1943 |
| 2,499,000 | Quarles | Feb. 28, 1950 |
| 2,625,614 | Schelleng | Jan. 13, 1953 |
| 2,632,792 | Selz | Mar. 24, 1953 |